US012691597B2

(12) United States Patent
Emminger

(10) Patent No.: US 12,691,597 B2
(45) Date of Patent: Jul. 28, 2026

(54) CUTTING SET FOR A HAIR CLIPPER WITH DUST GROOVE

(71) Applicant: WAHL GMBH, St. Georgen (DE)

(72) Inventor: Gerd Emminger, Niedereschach (DE)

(73) Assignee: WAHL GMBH, St. Georgen (DE)

( * ) Notice: Subject to any disclaimer, the term of this patent is extended or adjusted under 35 U.S.C. 154(b) by 34 days.

(21) Appl. No.: 18/919,183

(22) Filed: Oct. 17, 2024

(65) Prior Publication Data

US 2025/0128439 A1 Apr. 24, 2025

(30) Foreign Application Priority Data

Oct. 23, 2023 (DE) ..................... 10 2023 129 107.6

(51) Int. Cl.
*B26B 19/06* (2006.01)
*B26B 19/38* (2006.01)

(52) U.S. Cl.
CPC .......... *B26B 19/06* (2013.01); *B26B 19/3853* (2013.01)

(58) Field of Classification Search
None
See application file for complete search history.

(56) References Cited

U.S. PATENT DOCUMENTS 4,989,324 A * 2/1991 Andis ..................... B26B 19/06 30/221
10,702,999 B2 7/2020 Iaccarino et al.
2023/0278243 A1* 9/2023 Torres ..................... B26B 19/20 30/210

FOREIGN PATENT DOCUMENTS

CN 113084875 A 7/2021
DE 38 73 935 T2 12/1992
DE 10 2008 010 444 A1 9/2009
DE 102009015276 A1 * 10/2010 ........... B26B 19/205
DE 10 2015 111 690 A1 1/2017
EP 3072645 A2 * 9/2016 ............. B26B 19/06
JP S58- 86073 U 6/1983
WO WO-2021262975 A1 * 12/2021 ............. B26B 19/06

OTHER PUBLICATIONS

Office Action received in German Application No. 10 2023 129 107.6, dated May 28, 2024. Translation and Verification of Translation attached.
Office Action Response Submitted in German Application No. 10 2023 129 107.6, dated Oct. 7, 2024. Translation and Verification of Translation attached.
Claims as Granted in German Application No. 10 2023 129 107.6, dated Oct. 23, 2023. Translation and Verification of Translation attached.
Search Report received in European Application No. 24206146.3, dated Feb. 18, 2025.

* cited by examiner

*Primary Examiner* — Hwei-Siu C Payer
(74) *Attorney, Agent, or Firm* — Greer, Burns & Crain, Ltd

(57) ABSTRACT

A cutting set for a hair clipper, includes a first stationary cutting blade with a comb, a second cutting blade with a comb which is movable in a lateral direction towards the stationary cutting blade, and a connecting device which presses the second cutting blade against the first cutting blade, wherein behind the comb of the stationary cutting blade there is provided a dust groove, which runs over the entire width of the stationary cutting blade as far as both lateral ends, and wherein the dust groove increases in the direction of at least one lateral end in a height direction.

7 Claims, 3 Drawing Sheets

CUTTING SET FOR A HAIR CLIPPER WITH DUST GROOVE

BACKGROUND

The invention relates to a cutting set for a hair clipper with a dust groove.

STATE OF THE ART

With cutting sets for hair clippers, hair and hair particles can quickly contaminate and adhere to the drive mechanism of the cutting blades, making the mechanism sluggish and requiring relatively quick cleaning. To remedy this disadvantage, there are cutting sets in which on the stationary cutting blade behind the cutting comb there is provided a recess that runs straight, a so-called dust groove, which is intended to ensure when cutting hair that the cut hair and hair particles can fall out of the cutting set already during cutting. However, the hair and hair particles also get stuck in the dust groove itself, which means that soiling by hair and hair particles still occurs relatively quickly.

SUMMARY

The object of the invention is to provide a cutting set that has a higher resistance to soiling by hair and hair particles.

A cutting set according to the invention for a hair clipper comprises a first stationary cutting blade with a comb, a second cutting blade with a comb which can be moved back and forth towards the stationary cutting blade in a lateral direction, a connecting device which presses the second cutting blade against the first cutting blade, wherein behind the comb of the stationary cutting blade there is provided a dust groove, which runs over the entire width of the stationary cutting blade as far as both lateral ends, wherein the dust groove increases in the direction of at least one lateral end in a height direction. The dust groove extends as far as both ends of the cutting blade to allow the hair and hair particles to fall laterally out of the cutting set. If the dust groove increases, this means that the groove becomes deeper, i.e. the distance between the groove base and the upper edge of the groove becomes larger. The sloping base of the groove makes it easier for the hair and hair particles to slip out of the groove.

Preferably, the dust groove increases towards both lateral ends. This reduces the stretch that the hair and hair particles have to travel until they fall out sideways. In particular, the dust groove is configured symmetrically, so that the highest base point is arranged in the centre of the stationary cutting blade.

Furthermore, at least one lateral wall of the dust groove can be bevelled, in particular both lateral walls. This will guide the hair and hair particles more effectively into the dust groove.

Preference is given to a cutting set in which the dust groove increases gradually and/or in which the dust groove increases continuously. Gradually can take place, for example, via steps that are between 1 mm and 10 mm long, preferably at least 1 mm, 2 mm, 3 mm, 4 mm or 5 mm and a maximum of 10 mm, 9 mm, 8 mm, 7 mm or 6 mm. A continuous inclination of the groove base allows a more effective removal of the hair and hair particles. The step-like configuration, on the other hand, can prevent the hair and hair particles in the groove from slipping in the wrong direction, as they then get stuck to the steps. In a particularly preferred variant, the groove between the steps is also configured inclined, as a result of which the advantages of the inclined and stepped groove are combined.

Preferably, the width of the dust groove increases at least at the upper edge in the direction of at least one lateral end. This means that the distance between the front edge (facing the comb) and the rear edge becomes larger. This improves the housing capacity of the groove.

DETAILED DESCRIPTION

Figure 1A:
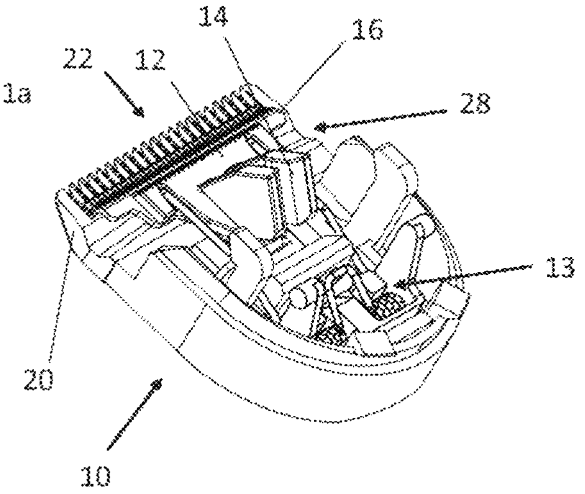
FIGS. 1*a* and 1*b* show isometric views of a cutting set according to the invention.
Figure 1B:
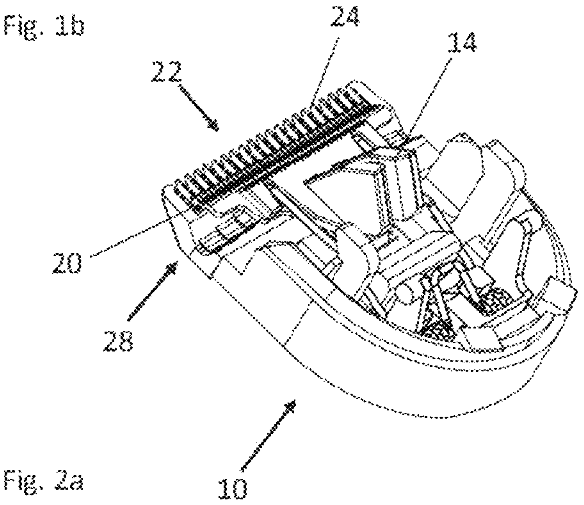

FIGS. 1*a* and 1*b* show an isometric view of a cutting set 10 according to the invention. The cutting set 10 comprises a stationary cutting blade 20 and a cutting blade 12 which is movable towards the stationary cutting blade 20. The two cutting blades 12, 20 are connected, for example, with a connecting device 13 that presses the two cutting blades 12, 20 against one another (here with a spring). Furthermore, on the movable cutting blade 12 there is provided a movement transmission device 14, with which a drive in a hair clipper can transmit the movement to the movable cutting blade 12. In this case, this movement transmission device 14 is configured as a lever that can absorb a movement generated by an electric motor and then converted into a translational movement, so that the movable cutting blade 12 is moved back and forth relative to the stationary cutting blade 20. The stationary cutting blade 20 does not move relative to the main body or the drive of the hair clipper.

The cutting blades 12, 20 each have a comb 16, 22 comprising a plurality of teeth 24. During cutting, hair passes between the teeth 24 of the two cutting blades 12, 20 and is cut off by the relative movement between the cutting blades.

Figure 2A:
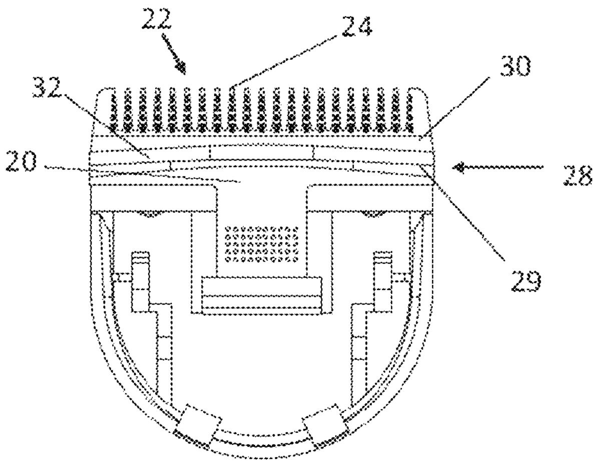
FIGS. 2*a* and 2*b* show top views on a stationary cutting blade with dust groove according to the invention.
Figure 2B:
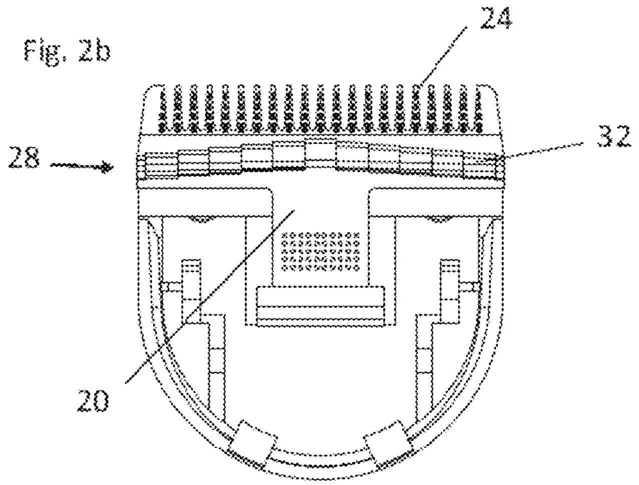
Figure 3A:
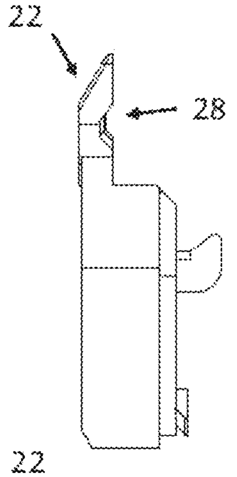
FIGS. 3*a* and 3*b* show side views of a stationary cutting blade with a dust groove according to the invention.
Figure 3B:
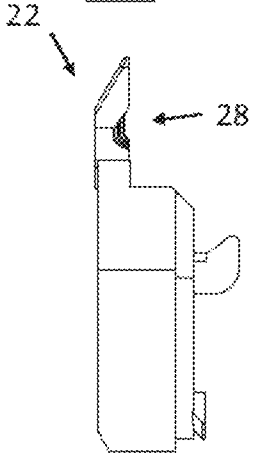

In FIGS. 2*a* and 2*b*, the stationary cutting blade 20 is shown in a top view. FIG. 2*a* shows thereby a dust groove 28 with an inclined base, and FIG. 2*b* shows a dust groove with a stepped base. A dust groove 28 can be seen in the top view. This extends behind the comb 22 over the entire width of the stationary cutting blade 20, so that the hair and hair particles located in the dust groove 28 can fall laterally out of the stationary cutting blade 20, in particular when they are pushed by following hair and hair particles. The dust groove 28 has two lateral walls 29, 30, which may in particular be configured inclined. This inclination of the walls can be clearly seen in the isometric view in FIG. 3 and makes it easier to house hair and hair particles. For this, it is sufficient if only one wall is configured inclined. FIGS. 3*a* and 3*b* show the stationary cutting blade 20 in a side view.

At least one of the walls 29, 30 of the dust groove 28 is preferably configured curved, so that the distance between the edges of the walls 29, 30 becomes larger toward the sides of the stationary cutting blade 20. Here, the edge of the lateral wall 30 facing the comb is configured straight, while the edge 31 of the wall 29 facing away from the comb is configured twisted. This enlarges the width of the groove 28 on the side, so that the hair and hair particles moved to the rim can fall out of the groove more easily. However, both lateral walls 29, 30 may also be configured bent. Preferably, the base 32 of the groove 28 can also widen toward the rim. Further, the dust groove 28 and the groove base 32 may also be configured bent, in particular away from the comb 22, so that the ends of the dust groove 28 are further away from the comb 22 than the centre of the dust groove 28. The dust groove 28 is preferably at the base between 3 mm and 10 mm wide, while it can preferably be between 3 mm and 15 mm wide at the upper edges of the groove.

Figure 4A:
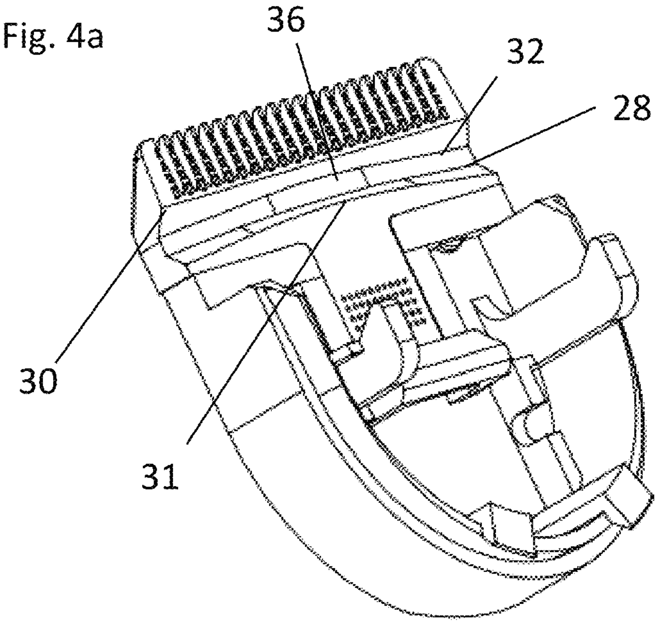
FIGS. 4*a* and 4*b* show isometric views of a stationary cutting blade with a dust groove according to the invention.
Figure 4B:
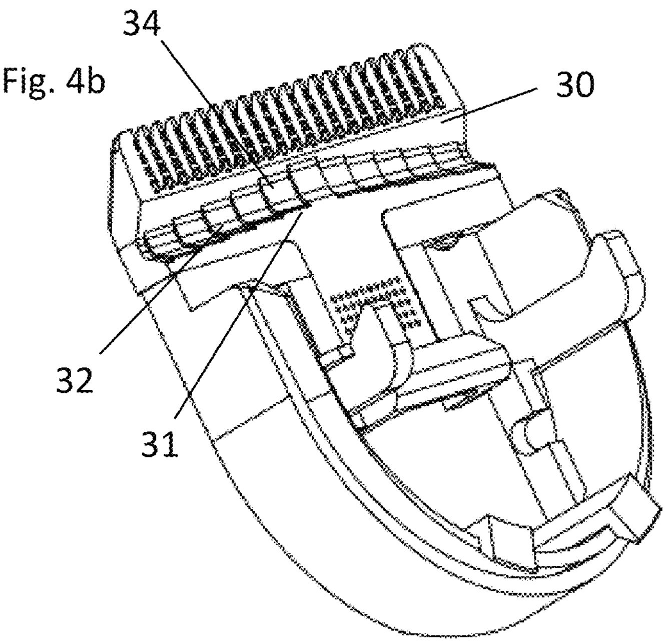

FIGS. 4*a* and 4*b* depict the different configurations of the dust groove 28 in an isometric view. FIG. 4*a* depicts an inclined dust groove 28 without steps. The inclination of the groove base 32 can be provided over the entire dust groove 28 or only over a part of the groove base. In FIG. 4*a*, there is a flat portion 36, which is arranged in particular centrally. From there, the groove base 32 in FIG. 4*a* is then configured sloping. FIG. 4*b* shows a stepped dust groove. The individual steps 34 are preferably at least 0.05 mm, 0.1 mm, 0.2 mm, 0.5 mm, 1 mm or 1.5 mm high and preferably at most 2 mm. Preferably, the individual steps are also between 2 mm and 8 mm long. The steps themselves are preferably also configured inclined.

The groove base 32 preferably has a radius at the transition to one or both lateral walls 29, 30, so that the transition between the groove base 32 and the lateral wall 29, 30 is rounded. As a result, hair and hair particles cannot get caught in the edges at the groove base and are more easily diverted. The radius is preferably between 0.1 mm and 3 mm.

While a particular embodiment of the present cutting set for a hair clipper with dust groove have been described herein, it will be appreciated by those skilled in the art that changes and modifications may be made thereto without departing from the invention in its broader aspects and as set forth in the following claims.

LIST OF REFERENCE SIGNS

10 cutting set
12 movable cutting set
13 connecting device
14 movement transmission device

16 comb
20 stationary cutting set
22 comb
24 tooth
28 dust groove
29 lateral wall
30 lateral wall
31 groove edge
32 groove base
34 step
36 flat portion

The invention claimed is:

1. A cutting set for a hair clipper, comprising:
a first stationary cutting blade with a comb;
a second cutting blade with a comb which can be moved back and forth toward the first stationary cutting blade in a lateral direction;
a connecting device that presses the second cutting blade against the first stationary cutting blade; and
wherein behind the comb of the first stationary cutting blade there is provided a dust groove, which runs over the entire width of the first stationary cutting blade as far as two opposing lateral ends thereof; and
the dust groove increases in the direction of at least one lateral end of said two opposing lateral ends in a height direction.

2. The cutting set according to claim 1, wherein the dust groove increases toward said two opposing lateral ends.

3. The cutting set according to claim 2, wherein the dust groove is configured symmetrically.

4. The cutting set according to claim 1, wherein at least one lateral wall of the dust groove is configured inclined.

5. The cutting set according to claim 1, wherein the dust groove increases gradually.

6. The cutting set according to claim 1, wherein the dust groove increases continuously.

7. The cutting set according to claim 1, wherein the width of the dust groove increases at least at an upper edge of the dust groove in the direction of at least one lateral end of said two opposing lateral ends.

* * * * *